United States Patent [19]

Kuwahara

[11] Patent Number: 5,045,739
[45] Date of Patent: Sep. 3, 1991

[54] COATED ROTOR FOR EDDY CURRENT TYPE RETARDER

[75] Inventor: Touru Kuwahara, Kawasaki, Japan

[73] Assignee: Isuzu Motors Limited, Tokyo, Japan

[21] Appl. No.: 540,659

[22] Filed: Jun. 19, 1990

[30] Foreign Application Priority Data

Jun. 20, 1989 [JP] Japan .................................. 1-155763

[51] Int. Cl.⁵ ..................... H02K 7/12; H02K 49/04; B32B 15/01
[52] U.S. Cl. .................... 310/105; 188/159; 188/218 R; 427/431; 310/45
[58] Field of Search .............. 188/164, 264 R, 264 A, 188/267, 159, 218 R; 310/93, 105, 45; 427/431

[56] References Cited

U.S. PATENT DOCUMENTS

| 3,583,533 | 6/1971 | Jones, Jr. | 188/218 R |
| 3,749,955 | 7/1973 | Fetzer | 310/93 |
| 4,545,117 | 10/1985 | Okamoto | 310/12 |
| 4,624,895 | 11/1986 | Nickola | 427/431 |
| 4,876,471 | 10/1989 | Lacour | 310/105 |
| 4,937,483 | 6/1990 | Matsui et al. | 310/93 |
| 4,943,748 | 7/1990 | Shiozawa | 310/67 R |

FOREIGN PATENT DOCUMENTS

| 777885 | 2/1968 | Canada | 310/105 |
| 63-61633 | 9/1989 | Japan | 310/105 |
| 652661 | 3/1979 | U.S.S.R. | 310/105 |
| 682124 | 11/1952 | United Kingdom | 310/105 |

Primary Examiner—Steven L. Stephan
Assistant Examiner—D. L. Rebsch
Attorney, Agent, or Firm—Dykema Gossett

[57] ABSTRACT

A rotor for an eddy current type retarder produces a brake force by producing eddy current using magnets mounted on a stationary member of the retarder. The rotor is mounted on a rotatable shaft and faces the magnets. The base member is made from a material containing steel. A thin film is formed on that face of the base member which faces the magnets. The film is made from a material containing rust-preventative material. A plurality of fins are formed on the base member by casting, using a material of good castability, with the base member as an insert. The rotor can be manufactured inexpensively and has the same characteristics as a rotor made from low-carbon-made steel.

14 Claims, 5 Drawing Sheets

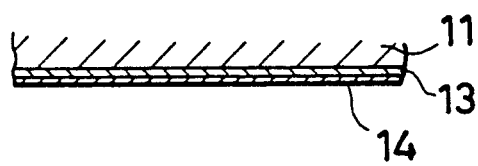
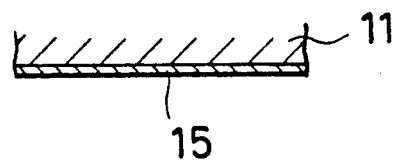
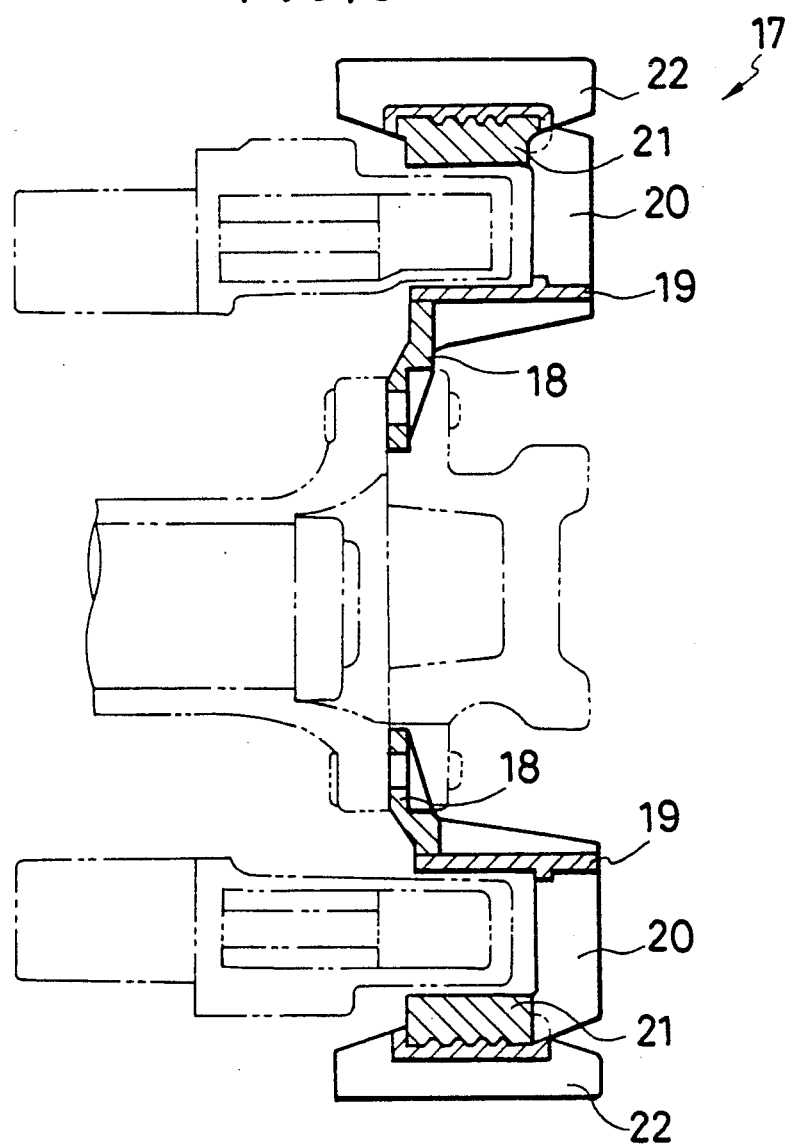

COATED ROTOR FOR EDDY CURRENT TYPE RETARDER

BACKGROUND OF THE INVENTION

1. Technical Field

The present invention relates to a rotor for an eddy current type retarder.

2. Background Art

A large vehicle such as a bus or a truck requires a large brake force to ensure safe and stable braking, particularly, for example, during long down-slope driving. An eddy current type retarder has been employed to realize such large braking force by producing a secondary braking force in addition to a primary braking force produced by a foot brake and another secondary braking force produced by an exhaust brake.

In an eddy current type retarder, a shaft and a rotor are rotated together in a magnetic field formed by magnets such that eddy current generated by the rotor produces the brake force. The rotor usually has fins on the outer surface thereof to release heat produced by the eddy current.

Meantime, it is required for the eddy current type retarder to generate a large eddy current and to effectively release the heat generated by the eddy current. In addition, with respect to material, the retarder has to be ferromagnetic, rigid against heat, electro-conductive and heat-conductive.

Heretofore, it has been proposed to manufacture the rotor from low-carbon steel. However, it is difficult to make the rotor from low-carbon steel since the shape of the fins is very complicated. Specifically, grinding or cutting of fins of complicated shape is necessary, or casting cast iron, whose castability is poor, is necessary. Either approach raises the manufacturing cost of the rotor. In addition, the rotor of low-carbon steel easily gathers rust since the rotor faces and is spaced from the magnet of the retarder. The rust lowers the braking efficiency.

SUMMARY OF THE INVENTION

An object of the present invention is to provide a rotor for an eddy current type retarder which is inexpensive in terms of manufacturing cost.

Another object of the present invention is to provide a rotor for an eddy current type retarder which does not gather rust.

A rotor for an eddy current type retarder according to one aspect of the present invention is characterized in that a plurality of magnets are mounted on a stationary member of the retarder such that the magnets face a base member mounted on a shaft, the base member is made from steel, that surface of the base member which faces the magnets is coated with a thin film made from rust-preventative material, and the heat radiation fins are cast, using a good castability material, on the base member as an integral element of the base member (the base member is an insert in this case). In this rotor, since the base member is made from steel, the rotor has characteristics equivalent to the rotor which is made from low-carbon steel. In addition, this rotor does not suffer from the drawback shared by the low-carbon steel rotor since that face of the base member which faces the magnets is coated with the anti-rust material and the rotor does not become rusted. Therefore, the designed brake force is maintained. Furthermore, since the heat radiation fins are formed by material having good castability, machining is not necessary. This means that the rotor can be manufactured in an easy manner and that the manufacturing cost is low.

The rust-preventative thin film is preferably made from an alloy of iron and aluminum. This alloy film maybe formed on the surface of the steel base member by aluminum hot-dipping. The alloy layer of iron and aluminum possesses the properties of being rust-resistant and having a high melting point. The melting point is higher than the highest temperature of the base member would reach, i.e., the temperature when a large eddy current is produced during high-speed rotation of the rotor. Therefore, the heat resistance and the rust-preventative properties of the rotor are maintained even when the rotor is used for a high-speed vehicle. Moreover, the electrical resistance of the alloy layer has a value higher than that of iron but lower than that of aluminum. Therefore, an eddy current larger than in the case of a low-carbon, steel-made rotor is produced. This means that the braking efficiency is high.

The heat radiation fins are preferably formed by casting the fins over the base member, using aluminum. The aluminum is superior to iron in castability and heat conductivity and lower than iron in specific gravity. Therefore, the fins can be manufactured inexpensively, can have adequate heat radiation properties and can be light in weight, which makes the rotor assembly light in weight in comparison with the rotor made of low-carbon steel. When the major object is to manufacture the fins at low cost, the fins are cast over the base member, using the cast iron, with the base member being an insert. The inexpensiveness and castability of the cast iron can lower the manufacturing cost as compared with a case using aluminum.

The thin film and fins may be formed at the same time, i.e., when the aluminum is cast over the base member. This reduces the manufacturing process. However, the thin film is made from aluminum so that the heat resistance thereof is inferior to the film made from the above-mentioned alloy. Even so, if the rotor is used for a medium-speed vehicle, it is possible to prevent rust from gathering on the base material since the temperature of the base member does not rise beyond the melting point of the aluminum, i.e., the thin film of aluminum never melts.

The configuration of the rotor varies with application factors. For example, the rotor may be in the form of a drum where the permanent magnet is used to produce the eddy current. In this case, a magnitude adjustment or on/off of the braking force may be performed by only moving the permanent magnet in the axial direction of the drum. Using a permanent magnet is advantageous where the eddy current type retarder is used as an auxiliary brake system of the exhaust brake and the retarder has to be compact. Where an electromagnet is employed, the rotor is preferably made in the form of a disc. The electromagnet is advantageous where a large eddy current is required.

BRIEF DESCRIPTION OF THE DRAWINGS

FIG. 3 is an enlarged view of a part "A" of FIG. 1;

FIG. 4 shows a fragmentary view of the rotor according to another embodiment of the present invention;

FIG. 5 shows a lateral view of still another embodiment of the present invention;

DESCRIPTION OF THE PREFERRED EMBODIMENTS

A preferred embodiment of the present invention will now be explained.

Figure 1:
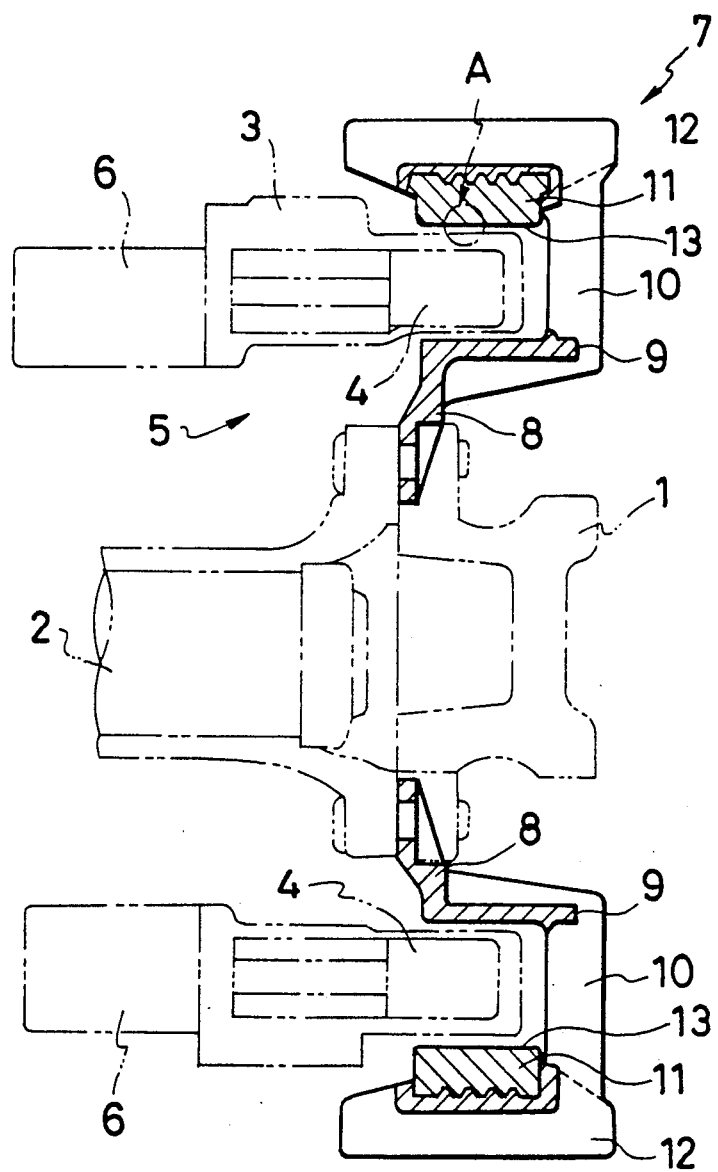
FIG. 1 is a sectional view showing a rotor for an eddy current type retarder of a first embodiment according to the present invention.

Referring to FIG. 1 of the accompanying drawings, a drum-shaped casing 3 for an eddy current type retarder is rotatably supported by a transmission output shaft 2. The transmission output shaft 2 is connected to a propeller shaft (not shown) via a flange 1. A plurality of permanent magnets 4 are arranged in a circular array in the casing 3, thereby defining a series of magnets 5. The magnet series 5 is aligned with the output shaft 2 and movable along the center line of the magnet series 5 or the output shaft 2. The polarity direction of one magnet of each two adjacent permanent magnets 4 is opposite to the polarity direction of the adjacent magnet. Therefore, N-poles and S-poles are arranged alternatively along the outer periphery as well as the inner periphery of the magnet array 5. A plurality of air cylinders 6 are provided in the casing 3 to move the magnet array 5 in the axial direction of the casing 3.

Figure 2:
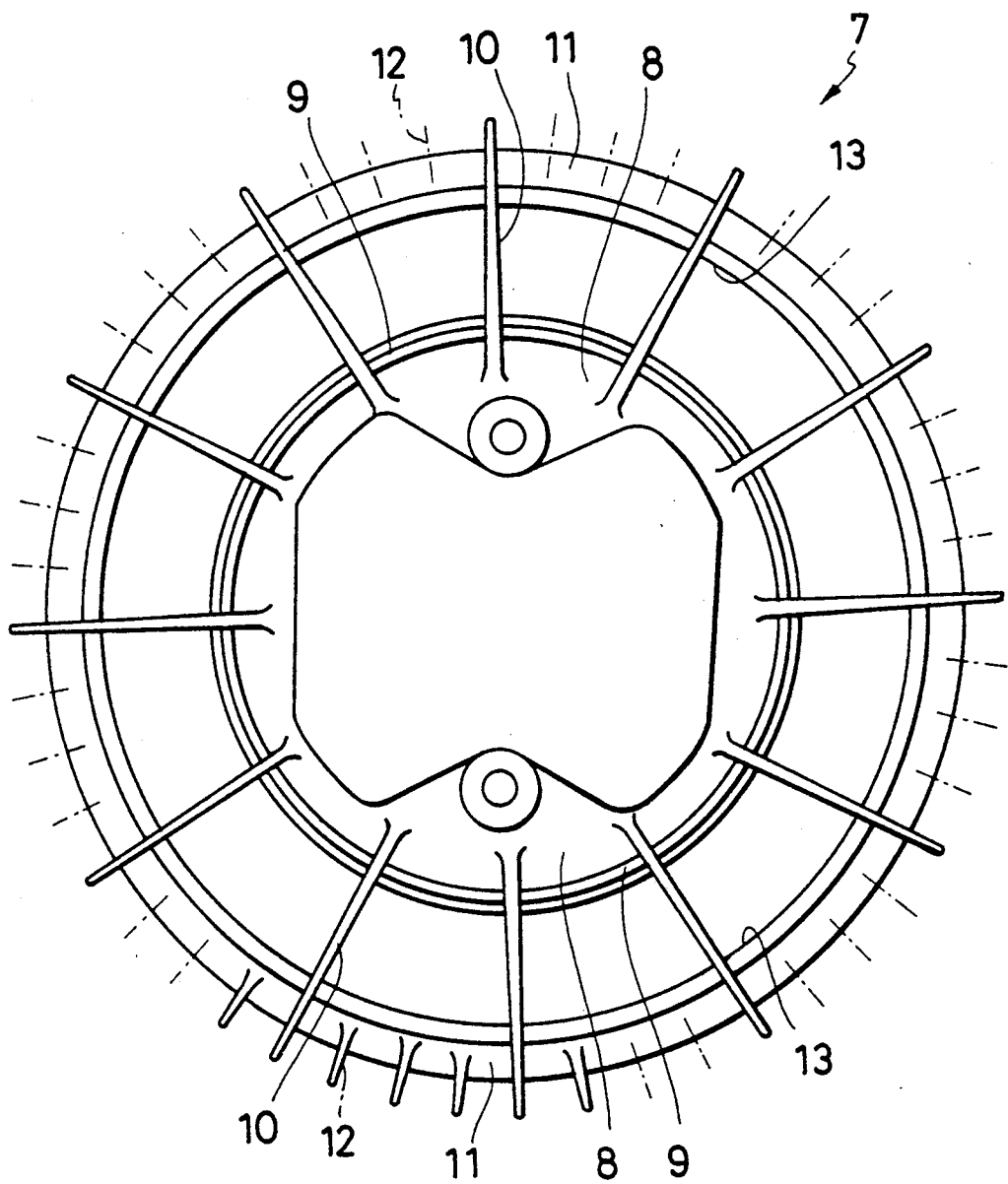
FIG. 2 is a front view of the rotor of the first embodiment.

A rotor 7 is coaxially mounted on the free end of the output shaft 2. The rotor 7 has a drum-like shape so that the rotor 7 can turn on/off braking torque upon reciprocation of the magnet array 5 in the axial direction of the drum. Specifically, as shown in FIG. 2, an inner cylindrical portion 9 is a portion engaging with the output shaft 2. The inner cylindrical portion 9 is coaxial with the output shaft 2. A plurality of spokes 10 are formed such that they radially extend from an outer periphery of the inner cylindrical portion 9. Another cylindrical portion 11 is formed as a base member on the spokes 10 such that it extends circumferentially near the free ends of the spokes 10. The outer cylindrical portion 11 is also coaxial with the output shaft 2. A plurality of heat radiating fins 12 are formed on the outer periphery of the outer cylindrical portion 11. The fins 12 are spaced circumferentially by predetermined intervals. Each fin 12 extends parallel to the axial direction of the rotor 7.

The outer cylinder portion 11 of the rotor 7 is made from low-carbon steel. A layer 13 of iron-aluminum alloy is formed on the inner surface of the outer cylindrical portion 11, as shown in FIG. 3, by aluminum hot-dipping. The thickness of the iron-aluminum alloy layer 13 is about 100 μm. The aluminum hot-dipping creates a pure aluminum layer 14 on the alloy layer 13. The spokes 10, heat radiation fins 12, inner cylindrical portion 9 and engaging portion 8 are respectively made from aluminum and formed integral with the outer cylindrical portion 11 by casting them using the aluminum with the outer cylindrical portion 11 being the insert.

The operation of the arrangement of the present invention will now be explained.

When the air cylinders 6 are activated to cause the array 5 of permanent magnets to advance toward the rotor 7 until the magnets 4 face the inner surface of the outer cylindrical portion 11 by a predetermined space, both poles of each two adjacent magnets 4 are magnetically connected to each other by magnetic flux penetrating the outer cylindrical portion 11 so that magnetic circuits are formed between each two adjacent magnets 4. The eddy current is produced on the surface of the outer cylindrical portion 11 as the rotor 7 rotates and the eddy current produces the braking torque. The braking torque is transmitted from the rotor 7 to the output shaft 2 of the transmission (not shown), thereby applying braking force to the output shaft 2.

The outer cylindrical portion 11, which faces the permanent magnets 4, is made from low-carbon steel; therefore, the functions of the rotor 7 are ensured. The iron-aluminum alloy layer 13 has rust-prevention properties and has a small electrical resistance. Therefore, it is possible to prevent rusting of the outer cylindrical portion 11 and a large eddy current is produced, which improves braking efficiency. The alloy layer 13 maintains its rigidity even at a temperature beyond 1000° C. Therefore, the rotor can be used for a high-speed vehicle whose transmission output shaft 2 rotates at a very high speed and generates a large eddy current. The temperature of the outer cylindrical portion 11 of such high-speed vehicle reaches about 700° C.

It is possible to inexpensively manufacture the first and second fins 10 and 12 which respectively have complicated shapes since the first and second fins 10 and 12 are formed integral with the outer cylindrical portion 11 by casting the first and second fins 10 and 12 over the outer cylindrical portion 11.

The rotor 7 is light in weight since it is made from aluminum whose specific gravity is low. This raises the braking force of the rotor 7. Also, the aluminum has excellent heat conductivity so that the fins 10 and 12 possess excellent heat radiation properties.

When the braking torque is no longer required, the air cylinder 6 pulls back the magnet array 5 from the rotor 7.

A second embodiment of the present invention will now be described, which focuses on reducing manufacturing costs and providing good castability.

After aluminum galvanizing on the outer surface of the low-carbon, steel-made outer cylindrical portion 11 by hot-dipping, the spokes 10, heat radiation fins 12, inner cylindrical portion 9 and engaging portion 8 are cast over the outer cylindrical portion 11, using gray cast iron (FC) or ductile iron (FCD), so that all of them become a single element.

The rotor of this embodiment, as compared with the rotor of the foregoing embodiment, is high in weight and poor in heat radiation properties. However, the former is low in manufacturing cost and easy to manufacture.

Next, a third embodiment of the present invention will be described. Emphasis is put on the following point in this embodiment: when the rotor is installed in a low or medium-speed vehicle, the temperature of the base member of the rotor is held below the melting point of the aluminum.

Referring to FIG. 4, which is similar to FIG. 3, a thin film 15 of aluminum is formed, by aluminum casting only, on that surface of the low-carbon, steel-made outer cylindrical portion 11 which faces the permanent magnets 4. Simultaneously, the heat radiation fins 12, spokes 10 and engaging portion 8 are formed on the outer cylindrical portion as integral parts.

Therefore, the rotor of this embodiment is inferior to the rotor of the first embodiment in heat resistance, due to the heat resistance of the aluminum thin film 15. However, when the rotor of this embodiment is used for a low or medium-speed vehicle, the aluminum thin film 15 does not peel off. In addition, a rotor of good heat radiation property can be manufactured inexpensively and easily since the spokes 10 and the fins 12 are simultaneously formed of aluminum as the aluminum thin film 15 is formed.

FIG. 5 shows still another embodiment of the present invention. In the foregoing embodiments, the heat radiation fins 12, spokes 10 and other elements are formed on the outer cylindrical portion 11 by casting as the integral elements; though, in the embodiment of FIG. 5, the outer cylindrical portion 21, spokes 20, inner cylindrical portion 19 and engaging portion 18 are separately made from low-carbon steel and joined together by welding. After that, the joined members undergo aluminum galvanizing by hot-dipping. Then, the heat radiation fins 22 are cast over the welded members, using aluminum or cast iron.

Therefore, the weight of the rotor 17 of this embodiment becomes large, but excellent heat strength is achieved.

Figure 6:
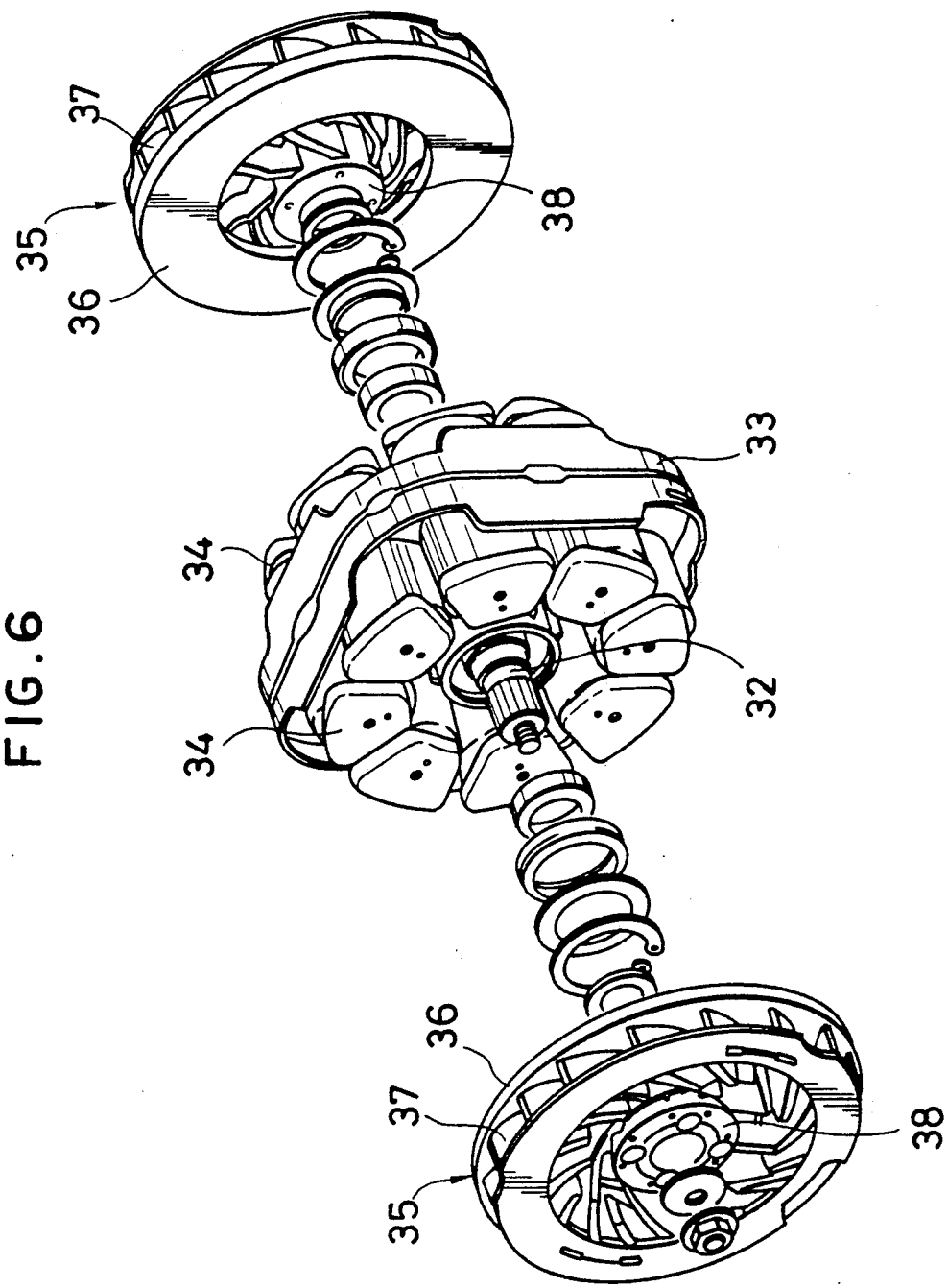
FIG. 6 illustrates another retarder in which the rotor of the present invention is installed.
Figure 7:
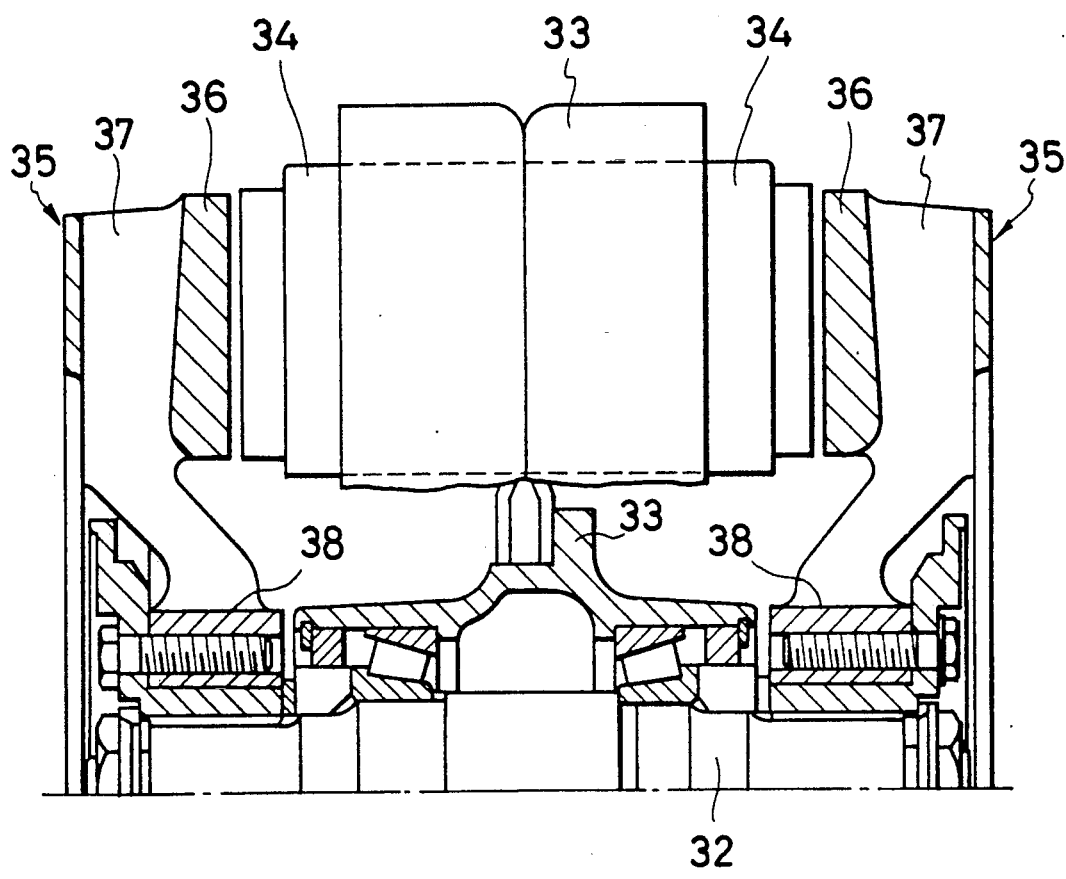
FIG. 7 illustrates a fragmentary lateral section of the retarder of FIG. 6.

The rotor of the present invention may be also used for the eddy current type retarder shown in FIGS. 6 or 7. As illustrated, the eddy current type retarder includes a shaft 32, a disc 33 rotatably supported on the shaft 32, plural, circumferentially spaced electrical magnets 34 mounted on both faces of the disc 33 and a couple of rotors 35 spaced from and facing the respective magnets 34. Each rotor 35 includes a disc-shaped base member 36 which faces the electrical magnets 34. The base member 36 is made from low-carbon steel and galvanized with aluminum by hot-dipping. The heat radiation fins 37 and boss portion 38 are integrally formed on the base member 36 by an aluminum or cast iron casting with the base member 36 being the insert. The boss portion 38 fixes the rotor on the shaft 32.

We claim:

1. A rotor for an eddy current type retarder of the type including a rotatable shaft, a plurality of magnets and a stationary member, the shaft having an axial direction and a radial direction, comprising:
   a base member mounted on the shaft and facing the plurality of magnets, the base member being made from a material containing steel and having part of the surface thereof facing the magnets;
   a thin film on the surface of the base member and formed from a material containing rust-preventative material; and
   heat radiation fins integrally formed on the base member and defined by a casting including a material having good castability.

2. The rotor of claim 1, wherein the thin film includes a layer of an iron and aluminum alloy.

3. The rotor of claim 2, wherein the alloy layer is defined by hot-dipped galvanized aluminum on the surface of the base member.

4. The rotor of claim 1, wherein the heat radiation fins are defined by an aluminum casting.

5. The rotor of claim 1, wherein the heat radiation fins are defined by a cast iron casting.

6. The rotor of claim 1, wherein the thin film includes a layer of aluminum alloy, the aluminum alloy layer is formed by galvanizing aluminum on the entire surface of the base member by hot-dipping, and the fins are formed on the aluminum alloy layer by aluminum casting.

7. The rotor of claim 6, wherein the fins are formed on the base member by cast iron casting with the base member as an insert.

8. The rotor of claim 1, wherein the film and fins are simultaneously formed on the base member by aluminum casting with the base member as an insert.

9. The rotor of claim 1, wherein the base member is cylindrical in shape such that the base member has an inner surface which faces the magnets and an outer surface, the base member is disposed coaxial with the shaft, the film is formed on the inner surface, and the fins are formed on the outer surface.

10. The rotor of claim 9, wherein the base member is mounted on the shaft via a plurality of spokes, and the spokes extend in the radial direction of the shaft and in a plane perpendicular to the axial direction of the shaft.

11. The rotor of claim 10, wherein the spokes are integrally formed when the fins are cast.

12. The rotor of claim 1, wherein the base member is shaped like a disc having two faces, the base member is mounted on the shaft in a manner such that one of the disc faces faces the magnets, a thin film is formed on the one of the disc faces and heat radiation fins are formed on the other disc face.

13. The rotor of claim 10, wherein a connection between the base member and the spokes includes a weldment such that the base member and the spokes are connected with each other integrally.

14. The rotor of claim 1, wherein said film covers the entire radially inner surface of said base member which faces said plurality of magnets.

* * * * *